United States Patent
Chen et al.

(10) Patent No.: US 9,868,837 B2
(45) Date of Patent: Jan. 16, 2018

(54) METHOD OF IMPROVING STABILITY OF POLYURETHANE POLYOL BLENDS CONTAINING HALOGENATED OLEFIN BLOWING AGENT

(75) Inventors: Benjamin Bin Chen, Wayne, PA (US); Joseph S. Costa, Gilbertsville, PA (US); Philippe Bonnet, Lyons (FR)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 13/643,124

(22) PCT Filed: Apr. 22, 2011

(86) PCT No.: PCT/US2011/033513
§ 371 (c)(1),
(2), (4) Date: Oct. 24, 2012

(87) PCT Pub. No.: WO2011/137033
PCT Pub. Date: Nov. 3, 2011

(65) Prior Publication Data
US 2013/0041048 A1    Feb. 14, 2013

Related U.S. Application Data

(60) Provisional application No. 61/328,795, filed on Apr. 28, 2010.

(51) Int. Cl.
| C08J 9/08 | (2006.01) |
| C08J 9/00 | (2006.01) |
| C08J 9/02 | (2006.01) |
| C08J 9/12 | (2006.01) |
| C08G 18/40 | (2006.01) |
| C08G 18/54 | (2006.01) |
| C08G 18/76 | (2006.01) |
| C08G 101/00 | (2006.01) |

(52) U.S. Cl.
CPC .......... C08J 9/08 (2013.01); C08G 18/4018 (2013.01); C08G 18/4027 (2013.01); C08G 18/544 (2013.01); C08G 18/7664 (2013.01); C08J 9/0019 (2013.01); C08J 9/0023 (2013.01); C08J 9/0095 (2013.01); C08J 9/02 (2013.01); C08J 9/12 (2013.01); C08G 2101/005 (2013.01); C08G 2101/0008 (2013.01); C08J 2203/02 (2013.01); C08J 2203/162 (2013.01); C08J 2203/184 (2013.01); C08J 2375/04 (2013.01)

(58) Field of Classification Search
CPC ...... C08J 9/0019; C08J 9/0023; C08J 9/0095; C08J 9/02; C08J 9/08; C08J 9/12; C08J 2203/02; C08J 2203/184; C08J 2203/142; C08J 2375/04
USPC ........................................ 516/10, 12, 18, 19
See application file for complete search history.

(56) References Cited

U.S. PATENT DOCUMENTS

| 5,385,952 | A | * | 1/1995 | Fishback et al. ............. 521/131 |
| 5,397,810 | A |   | 3/1995 | Ozaki et al. |
| 5,696,306 | A | * | 12/1997 | Ide et al. ...................... 570/109 |
| 5,922,779 | A |   | 7/1999 | Hickey |
| 6,586,484 | B1 |  | 7/2003 | Arito et al. |
| 7,972,524 | B2 |  | 7/2011 | Robin |
| 8,097,181 | B2 |  | 1/2012 | Leck et al. |
| 8,658,708 | B2 |  | 2/2014 | Loh et al. |
| 8,668,791 | B2 |  | 3/2014 | Leck et al. |
| 2002/0123535 | A1 | | 9/2002 | Araullo-McAdams et al. |
| 2006/0014843 | A1 | | 1/2006 | Tanaka et al. |
| 2009/0099272 | A1 | | 4/2009 | Willaims et al. |
| 2009/0099274 | A1 | * | 4/2009 | Van Der Puy et al. ...... 521/110 |
| 2009/0127915 | A1 | | 5/2009 | Nozawa et al. |
| 2009/0305876 | A1 | | 12/2009 | Singh et al. |
| 2011/0240903 | A1 | | 10/2011 | Robin |
| 2012/0329893 | A1 | | 12/2012 | Abbas |

FOREIGN PATENT DOCUMENTS

WO   WO 2009/067720 A2   5/2009

OTHER PUBLICATIONS

Honeywell Solstice® Liquid Blowing Agent Technical Information, 2012, p. 1-7.*

* cited by examiner

*Primary Examiner* — Robert Jones, Jr.
(74) *Attorney, Agent, or Firm* — Steven D. Boyd

(57) ABSTRACT

The present invention is directed towards a method of stabilizing thermosetting foam blends such as polyurethane poly blends containing a blowing agent with negligible (low or zero) ozone-depletion and low GWP based upon unsaturated halogenated hydroolefins in which one or more ester is added to the thermosetting foam blends. The thermosetting foam blends typically in clued: polyol(s); surfactant(s); catalyst(s); flame retardent(s); organic acid inhibitor(s)/stabilizer(s); carbon dioxide generating agent(s). The addition of the one or more esters to the thermosetting foam blends was unexpectedly found to result in blends which were stable over time and the resulted foams have a uniform cell structure with little or no foam collapse.

3 Claims, 1 Drawing Sheet

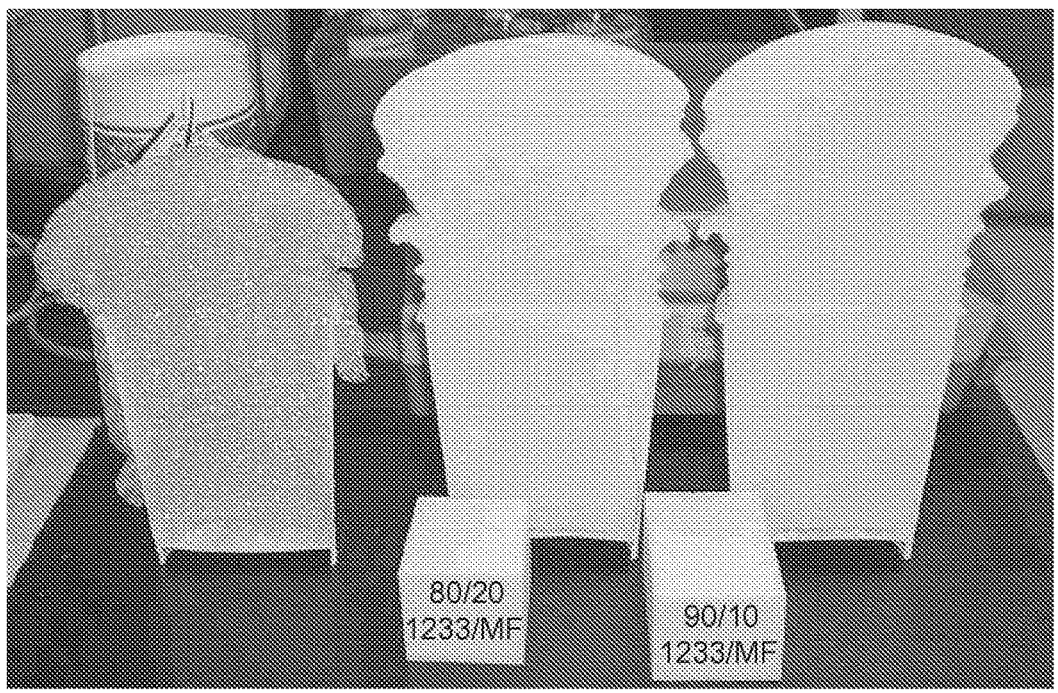
A　　　　　　　　B　　　　　　　　C

METHOD OF IMPROVING STABILITY OF POLYURETHANE POLYOL BLENDS CONTAINING HALOGENATED OLEFIN BLOWING AGENT

FIELD OF THE INVENTION

The present invention relates to a method of stabilizing thermosetting foam blends that incorporate hydrochlorofluoroolefin blowing agents such as HCFO 1233zd. The thermosetting foam blends can comprise polyurethan polyols blends that include a polyol, a surfactant, a catalyst, a flame retardant, a stabilizer/inhibitor, a halogated olefin, a carbon dioxide generating agent and astabilizing ester. The addition of the ester to the blends results in stability of the blends over time and the resultant foams have a uniform cell structure with little or no foam collapse.

BACKGROUND OF THE INVENTION

The Montreal Protocol for the protection of the ozone layer mandated the phase out of the use of chlorofluorocarbons (CFCs). Materials more "friendly" to the ozone layer, such as hydrofluorocarbons (HFCs) eg HFC-134a replaced chlorofluorocarbons. The latter compounds have proven to be green house gases, causing global warming and were regulated by the Kyoto Protocol on Climate Change. The emerging replacement materials, hydrofluoropropenes, were shown to be environmentally acceptable i.e. has zero ozone depletion potential (ODP) and acceptable low global warming potential (GWP).

Currently used blowing agents for thermoset forms include HFC-134a, HFC-245fa, HFC-365mfc that have relatively high global warming potential, and hydrocarbons such as pentane isomers which are flammable and have low energy efficiency. Therefore, new alternative blowing agents are being sought. Halogenated hydroolefinic materials such as hydrofluoropropenes and/or hydrochlorofluoropropenes have generated interest as replacements for HFCs. The inherent chemical instability of these materials in the lower atmosphere provides for a low global warming potential and zero or near zero ozone depletion properties desired.

US 2009/0099272 A1 disclosed, "A shortcoming of two-component systems, especially those using certain hydrahaloolefins, including, HFO-1234ze and HFCO-1233zd is the shelf-life of the B-side composition. Normally when a foam is produced by bringing together the A and B component, a good foam is obtained. However, if the polyol premix composition is aged, prior to treatment with the polyisocyanate, the foam are of lower quality and may even collapse during the formation of foam".

SUMMARY OF THE INVENTION

It was discovered that the addition of an ester to the thermosetting foam blends that incorporate unsaturated halogenated hydroolefin blowing agents, such as polyol premix B-side, stabilized the blend and prolong the shelf life of the premix and enhanced foam characteristics of the resultant foam. The object of the present invention is to provide method of stabilizing thermosetting foam blends compositions such as polyurethane foams that provide long shelf life and enhanced foam characteristics to meet the demands of low or zero ozone depletion potential, lower global warming potential and exhibit low toxicity.

BRIEF DESCRIPTION OF THE DRAWINGS

FIG. 1 is a photo of foams prepared in accordance with Example 2.

DETAILED DESCRIPTION OF THE INVENTION

The present invention relates to a method of stabilizing thermosetting foam blends such as polyurethane poly blends containing a blowing agent with negligible (low or zero) ozone-depletion and low GWP based upon unsaturated halogenated hydroolefins; polyol(s); surfactant(s); catalyst(s); flame retardent(s); organic acid inhibitor(s)/stabilizer(s); carbon dioxide generating agent(s); by adding one or more ester(s). The blends are unexpectedly stable over time and the resulted foams have a uniform cell structure with little or no foam collapse.

The blowing agent in the thermosetting foam blends of the present invention comprises an unsaturated halogenated hydroolefin such as hydrofluoroolefins (HFOs), hydrochlorofluoroolefins (HCFOs), hydrofluorocarbons (HFCs), hydrofluoroethers (HFEs), and mixtures thereof and optionally hydrocarbons, alcohols, aldehydes, ketones, ethers/diethers or carbon dioxide.

The preferred blowing agent in the thermosetting foam blend of the present invention is a hydrofluoroolefin or a hydrochlorofluoroolefin, alone or in a combination. Preferred hydrofluoroolefin (HFO) blowing agents contain 3, 4, 5, or 6 carbons, and include but are not limited to pentafluoropropenes such as 1,2,3,3,3-pentafluoropropene (HFO 1225ye); tetrafluoropropenes such as 1,3,3,3-tetrafluoropropene (HFO1234ze, E and Z isomers), 2,3,3,3-tetrafluoropropene (HFO 1234yf), 1,2,3,3-tetrafluoropropene (HFO1234ye); trifluoropropenes such as 3,3,3-trifluoropropene (1243zf); tetrafluorobutenes such as (HFO 1345); pentafluorobutene isomers such as (HF01354); hexafluorobutene isomers such as (HFO1336); heptafluorobutene isomers such as (HF01327); heptafluoropentene isomers such as (HF01447); octafluoropentene isomers such as (HF01438); nonafluoropentene isomers such as (HFO1429). HCFOs such as, 1-chloro-3,3,3-trifluoropropene (HCFO-1233zd), 2-chloro-3,3,3-trifluoropropene (HCFO-1233xf), HCF01223, 1,2-dichloro-1,2-difluoroethene (E and Z isomers), 3,3-dichloro-3-fluoropropene, 2-chloro-1,1,1,4,4,4-hexafluorobutene-2 (E and Z isomers), 2-chloro-1,1,1,3,4,4,4-heptafluorobutene-2 (E and Z isomers). Preferred blowing agents in the thermosetting foam blends of the present invention comprise unsaturated halogenated hydroolefins with normal boiling points less than about 60° C. Preferred hydrochlorofluoroolefin blowing agents include but are not limited to 1-chloro-3,3,3-trifluoropropene, E and/or Z 1233zd.

The blowing agents in the thermosetting foam blend of the present invention can be used alone or in combination with other blowing agents including but not limited to: (a) hydrofluorocarbons including but not limited to difluoromethane (HFC32); 1,1,1,2,2-pentafluoroethane (HFC125); 1,1,1-trifluoroethane (HFC143a); 1,1,2,2-tetrafluorothane (HFC134); 1,1,1,2-tetrafluoroethane (HFC134a); 1,1-difluoroethane (HFC152a); 1,1,1,2,3,3,3-heptafluoropropane (HFC227ea); 1,1,1,3,3-pentafluopropane (HFC245fa); 1,1,1,3,3-pentafluobutane (HFC365mfc) and 1,1,1,2,2,3,4,5,5,5-decafluoropentane (HFC4310mee), (b) hydrocarbons including but not limited to, pentane isomers and butane isomers, (c) hydrofluoroethers (HFE) such as, $C_4F_9OCH_3$ (HFE-7100), $C_4F_9OC_2H_5$ (HFE-7200), $CF_3CF_2OCH_3$ (HFE-245cb2), $CF_3CH_2CHF_2$ (HFE-245fa), $CF_3CH_2OCF_3$ (HFE-236fa), $C_3F_7OCH_3$ (HFE-7000), 2-trifluoromethyl-3-ethoxydodecofluorohexane (HFE 7500), 1,1,1,2,3-hexafluoro-4-(1,1,2,3,3,3-hexafluoropropoxy)-pentane (HFE-7600), 1,1,1,2,2,3,5,5,5-decafluoro-3-methoxy-4-(trifluoromethyl)pentane (HFE-7300), ethyl nonafluoroisobutyl ether/ethyl nonafluorobutyl ether (HFE 8200), $CHF_2OCHF_2$, $CHF_2$—$OCH_2F$, $CH_2F$—$OCH_2F$, $CH_2F$—$O$—$CH_3$, cyclo-$CF_2CH_2CF_2$—$O$, cyclo-$CF_2CF_2CH_2$—$O$, $CHF_2$—$CF_2CHF2$, $CF_3CF_2$—$OCH_2F$, $CHF_2$—$O$—$CHFCF_3$, $CHF_2$—$OCF_2CHF_2$, $CH_2F$—$O$—$CF_2CHF_2$, $CF_3$—$O$—$CF_2CH_3$, $CHF_2CHF$—$O$—$CHF_2$, $CF_3$—$O$—$CHFCH_2F$, $CF_3CHF$—$O$—$CH_2F$, $CF_3$—$O$—$CH_2CHF_2$, $CHF_2$—$O$—$CH_2CF_3$, $CH_2FCF_2$—$O$—$CH_2F$, $CHF2$-$O$—$CF_2CH_3$, $CHF_2CF_2$—$O$—$CH_3$ (HFE254 pc), $CH_2F$—$O$—$CHFCH_2F$, $CHF_2$—$CHF$—$O$—$CH_2F$, $CF_3$—$O$—$CHFCH_3$, $CF_3CHF$—$O$—$CH_3$, $CHF_2$—$O$—$CH_2CHF_2$, $CF_3$—$O$—$CH_2CH_2F$, $CF_3CH_2$—$O$—$CH_2F$, $CF_2HCF_2CF_2$—$O$—$CH_3$, $CF_3CHFCF_2$—$O$—$CH_3$, $CHF_2CF_2CF_2$—$O$—$CH_3$, $CHF_2CF_2CH_2$—$OCHF_2$, $CF_3CF_2CH_2$—$O$—$CH_3$, $CHF_2CF_2$—$O$—$CH_2CH_3$, $(CF_3)_2CF$—$O$—$CH_3$, $(CF_3)_2CH$—$O$—$CHF_2$, $(CF_3)_2CH$—$O$—$CH_3$, and mixture thereof; (d) C1 to C5 alcohols, C1 to C4 aldehydes, C1 to C4 ketones, C1 to C4 ethers and diethers and carbon dioxide.

The thermosetting foam blends of the present invention include one or more components capable of forming foam having a generally cellular structure and blowing agent(s). Examples of thermosetting compositions include polyurethane and polyisocyanurate foam compositions, and also phenolic foam compositions preferably low-density foams, flexible or rigid.

The invention also relates to foam, and preferably closed cell foam, prepared from a thermosetting foam formulation to which has been added a stabilizing amount of an ester.

The order and manner in which the blowing agent and ester combination of the present invention is formed and/or added to the foamable composition does not generally affect the operability of the present invention. For example, in the case of polyurethane foams, it is possible that the various components of the blowing agent and ester combination not be mixed in advance of introduction to the foaming equipment, or even that the components are not added to the same location in the foaming equipment. Thus, in certain embodiments it may be desired to introduce one or more components of the blowing agent and ester combination in such a way that the components will come together in the foaming equipment. Nevertheless, in certain embodiments, the components of the blowing agent and ester combination are combined in advance and introduced together into the foamable composition, either directly or as part of premix that is then further added to other parts of the foamable composition.

In certain embodiments in the preparation of polyurethane polyol foams, the b-side polyol premix can include polyols, silicon or non-silicon based surfactants, amine or non-amine based catalysts, flame retardants/suppressors, acid scavengers, radical scavengers, fillers, and other necessary stabilizers/inhibitors Exemplary polyols include: Glycerin based polyether polyols such as Carpol GP-700, GP-725, GP-4000, GP-4520; Amine based polyether polyols such as Carpal TEAP-265 and EDAP-770, Jeffol AD-310; Sucrose based polyether polyol, such as Jeffol SD-360, SG-361, and SD-522, Voranol 490, Carpol SPA-357; Mannich based polyether polyol such as Jeffol R-425X and R-470X; Sorbitol based polyether polyol such as Jeffol S-490; Aromatic polyester polyols such as Terate 2541 and 3510, Stepanpol PS-2352, Terol TR-925.

Exemplary catalysts include: N,N-dimethylethanolamine (DMEA), N,N-dimethylcyclohexylamine (DMCHA), Bis(N,N-dimethylaminoethyl)ether (BDMAFE), N,N,N',N',N"-pentamethyldiethylenetriamine (PDMAFE), 1,4-diazadicyclo[2,2,2]octane (DABCO), 2-(2-dimethylaminoethoxy)-ethanol (DMAFE), 2-((2-dimethylaminoethoxy)-ethyl methyl-amino)ethanol, 1-(bis(3-dimethylamino)-propyl)amino-2-propanol, N,N',N"-tris(3-dimethylamino-propyl)hexahydrotriazine, dimorpholinodiethylether (DMDEE), N.N-dimethylbenzylamine, N,N,N',N",N"-pentaamethyl-dipropylenetriamine, N,N'-diethylpiperazine. In particular, sterically hindered primary, secondary or tertiary amines are useful, for example, dicyclohexylmethylamine, ethyldiisopropylamine, dimethylcyclohexylamine, dimethylisopropylamine, methylisopropylbenzylamine, methylcyclopentylbenzylamine, isopropyl-sec-butyl-trifluoroethylamine, diethyl-α-phenylethyl)amine, tri-n-propylamine, dicyclohexylamine, t-butylisopropylamine, di-t-butylamine, cyclohexyl-t-butylamine, de-sec-butylamine, dicyclopentylamine, di-α-trifluoromethylethyl)amine, di-(α-phenylethyl) amine, triphenylmethylamine, and 1,1,-diethyl-n-propylamine. Other sterically hindered amines include morpholines, imidazoles, ether containing compounds such as dimorpholinodiethylether, N-ethylmorpholine, N-methylmorpholine, bis(dimethylaminoethyl)ether, imidizole, nomethylimidazole, 1,2-dimethylimidazole, dimorpholinodimethylether, N,N,N',N',N",N"-pentamethyldiethylenetriamine, N,N,N',N',N",N"-pentaethyldiethylenetriamine, N,N,N',N',N",N"-pentamethyldipropylenetriamine, bis(diethylaminoethyl) ether, bis(dimethylaminopropyl)ether, or combination thereof.

Exemplary non-amine catalysts include organometallic compounds containing bismuth, lead, tin, antimony, cadmium, cobalt, iron, thorium, aluminum, mercury, zinc, nickel, cerium, molybdenum, titanium, vanadium, copper, manganese, zirconium, magnesium, calcium, sodium, potassium, lithium or combination thereof such as stannous octoate, dibutyltin dilaurate (DGTDL), dibutyltin mercaptide, phenylmercuric propionate, lead octoate, potassium acetate/octoate, magnesium acetate, titanyl oxalate, potassium titanyl oxalate, quaternary ammonium formates, ferric acetylacetonate and combination thereof.

The use level of catalysts are typically in an amount of from about 0.1 ppm to 6.00 wt % of the polyol premix, preferably from about 0.5 ppm to 4 wt %, and more preferably from about 1 ppm to 2 wt %.

Exemplary surfactants include polysiloxane polyoxyalkylene block co-polymer such as B8404, B8407, B8409, B8462 and B8465 available from Goldschmidt; DC-193, DC-197, DC-5582, and DC-5598 available from Air Products; and L-5130, L5180, L-5340, L-5440, L-6100, L-6900, L-6980, and L6988 available from Momentive. Exemplary non-silicone surfactants include salts of sulfonic acid, alkali metal salts of fatty acid, ammonium salts of fatty acid, oleic acid, stearic acid, dodecylbenzenedidulfonic acid, dinaphthylmetanedissulfonic acid, ricinoleic acid, an oxyethylated alkylphenol, an oxyethylated fatty alcohol, a paraffin oil, a caster oil ester, a ricinoleic acid ester, Turkey red oil, groundnut oil, a paraffin fatty alcohol, or combination thereof. Typically use levels of surfactants are from about 0.4 to 6 wt % of polyol premix, preferably from about 0.8 to 4.5 wt %, and more preferably from about 1 to 3 wt %.

Exemplary flame retardants include richloropropyl phosphate (TCPP), triethyl phosphate (TEP), diethyl ethyl phosphate (DEEP), diethyl bis(2-hydroxyethyl)amino methyl phosphonate, brominated anhydride based ester, dibromoneopentyl glycol, brominated polyether polyol, melamine, ammonium polyphosphate, aluminum trihydrate (ATH), tris (1,3-dichloroisopropyl)phosphate, tri)-2-chlororthyl)phosphate, tri(2-chloroisopropyl)phosphate, chloroalkyl phosphate/oligomeric phosphonate, oligomeric chloroalkyl phosphate, brominated flame retardant based on pentabromo diphenyl ether, dimethyl methyl phosphonate, diethyl N,N bis(2-hydroxyethyl)amino methyl phosphonate, oligomeric phosphonate, and derivatives thereof.

In certain embodiments, acid scavengers, radical scavengers, and other stabilizers/inhibitors are included in the premix. Exemplary stabilizer/inhibitors include 1,2-epoxy butane; glycidyl methyl ether; cyclic-terpenes such as dl-limonene, 1-limonene, d-limonene; 1,2-epoxy-2,2-methylpropane; nitromethane; diethylhydroxyl amine; alpha methylstyrene; isoprene; p-methoxyphenol; m-methoxyphenol; dl-limonene oxide; hydrazines; 2,6-di-t-butyl phenol; hydroquinone; organic acids such as carboxylic acid, dicarboxylic acid, phosphonic acid, sulfonic acid, sulfamic acid, hydroxamic acid, formic acid, acetic acid, propionic acid, butyric acid, caproic acid, isocaprotic acid, 2-ethylhexanoic acid, caprylic acid, cyanoacetic acid, pyruvic acid, benzoic acid, oxalic acid, malonic acid, succinic acid, adipic acid, azelaic acid, trifluoroacetic acid, methanesulfonic acid, benzenesulfonic acid, and combination thereof. Other additives such as adhesion promoters, anti-static agents, antioxidants, fillers, hydrolysis agents, lubricants, anti-microbial agents, pigments, viscosity modifiers, UV resistance agents may also be included. Examples of these additives include: sterically hindered phenols; diphenylamines; benzofuranone derivatives; butylated hydroxytoluene (BHT); calcium carbonate; barium sulphate; glass fibers; carbon fibers; microspheres; silicas; melamine; carbon black; waxes and soaps; organometallic derivatives of antimony, copper, and arsenic; titanium dioxide; chromium oxide; iron oxide; glycol ethers; dimethyl AGS esters; propylene carbonate; and benzophenone and benzotriazole compounds.

In the present invention, an ester is added to a thermosetting foam blend. This was discovered to provide for stability of the blend over time, as in extending shelf life of the premix and enhancing the properties of the resultant foam. Esters used in the present invention have the formula R—C(O)—O—R', where R and R' can be $C_aH_{c-b}G_b$, where G is a halogen such as F, Cl, Br, I, a=0 to 15, b=0 to 31, and c=1 to 31, and include esters that are the product of dicarboxylic acid, phosphinic acid, phosphonic acid, sulfonic acid, sulfamic acid, hydroxamic acid or combination thereof. Preferred esters are the products of an alcohol such as methanol, ethanol, ethylene glycol, diethylene glycol, propanol, isopropanol, butanol, iso-butanol, pentanol, isopentanol and mixtures thereof; and an acid such as formic, acetic, propionic, butyric, caproic, isocaprotic, 2-ethylhexanoic, caprylic, cyanoacetic, pyruvic, benzoic, oxalic, trifluoacetic, oxalic, malonic, succinic, adipic, zaelaic, trifluoroacetic, methanesulfonic, benzene sulfonic acid and mixture thereof. The more preferred esters are allyl hexanoate, benzyl acetate, benzyl formate, bornyl acetate, butyl butyrate, ethyl acetate, ethyl propanoate, ethyl butyrate, ethyl hexanoate, ethyl cinnamate, ethyl formate, ethyl heptanoate, ethyl isovalerate, ethyl lactate, ethyl nonanoate, ethyl pentanoate, geranyl acetate, geranyl butyrate, geranyl pentanoate, isobutyl acetate, isobutyl formate, isoamyl acetate, isoamyl formate, isopropyl acetate, isopropyl formate, linalyl acetate, linalyl butyrate, linalyl formate, methyl acetate, methyl anthranilate, methyl benzoate, methyl butyrate, methyl cinnamate, methyl formate, methyl isobutyrate, methyl pentanoate, methyl propanoate, methyl phenylacetate, methyl salicylate, nonyl caprylate, octyl acetate, octyl butyrate, amyl acetate/pentyl acetate, pentyl butyrate/amyl butyrate, pentyl hexanoate/amyl caproate, pentyl pentanoate/amyl valerate, propyl ethanoate, propyl isobutyrate, terpenyl butyrate and mixtures thereof. Most preferred esters are methyl formate, ethyl formate, methyl acetate, isopropyl formate, isobutyl formate, isoamyl formate, methyl benzoate, benzyl formate, ethyl acetate and mixtures thereof.

The ester can be added in combination with the blowing agent, or can be added separately from the blowing agent into thermosetting foam blend by the means known in art. The typical amount of an ester is from about 0.1 wt % to 10 wt % of thermosetting foam blend, the preferred amount of an ester is from about 0.2 wt % to 7 wt % of thermosetting foam blend, and the more preferred amount of an ester is from about 0.3 wt % to 5 wt % of thermosetting foam blend.

EXAMPLES

Example 1

The formulations tested (all had an Iso Index of 115) each contained: Rubinate M, a polymeric methylene diphenyl diisocyanate (MDI) available from Huntsman; Jeffol R-425-X, a polyol from Huntsman; Voranol 490, a polyol from Dow Chemical; Stephan 2352, a polyol from Stepan; TCPP a flame retardant from Rhodia; B 8465 a surfactant from Evonik Corp.; Polycat 8 and 5 (pentamethyldiethylenetriamine, PMDETA) available from Air Products. Total blowing agent level was 20.0 mls/g. Table 1 summarizes the formulations tested, A, B and C.

TABLE 1

| Formulation | % (Weight) | | |
| --- | --- | --- | --- |
| | A | B | C |
| Voranol 490 | 18.10 | 18.30 | 18.40 |
| Jeffol R-425-X | 10.90 | 11.00 | 11.00 |
| Stepan 2352 | 7.20 | 7.30 | 7.40 |
| PMDETA (PC-5) | 0.07 | 0.07 | 0.07 |
| DMCHA (PC-8) | 0.37 | 0.37 | 0.37 |
| Tegostab B 8465 | 0.71 | 0.71 | 0.71 |
| TCPP | 2.36 | 2.36 | 2.36 |
| Water | 0.64 | 0.64 | 0.64 |
| 1233zd | 7.00 | 5.61 | 4.53 |
| Methyl formate | 0.00 | 0.64 | 1.14 |
| Rubinate M | 52.7 | 53.1 | 53.4 |

The A-side (MDI) and freshly prepared B-side (mixture of the polyol, surfactant, catalysts, blowing agent, and additives) were mixed with a hand mixer and dispensed into a container to form a free rise foam. The dispensed material was allowed to expand in an open container. The reactivities, density, and foam quality are summarized in Table 2.

TABLE 2

| | A | B | C |
| --- | --- | --- | --- |
| Cream time (s) | 12 | 13 | 13 |
| Gel time (s) | 50 | 49 | 49 |
| Tack free time (s) | 109 | 93 | 92 |
| Free rise density (pcf) | 2.09 | 2.09 | 2.14 |
| Foam quality | Good | Good | Good |

As Table 2 shown, the freshly made polyol blends produced foams with similar free rise density and foam quality.

Example 2

The B-side polyol blends of formula A, B, and C were then aged under ambient conditions for 9 months, and foams were made in the same manner as in Example 1, the results were summarized in Table 3

TABLE 3

|  | A | B | C |
| --- | --- | --- | --- |
| Cream time (s) | 21 | 17 | 13 |
| Gel time (s) | 61 | 73 | 66 |
| Tack free time (s) | —* | 150 | 130 |
| Free rise density (pcf) | —* | 2.27 | 2.32 |
| Foam quality | Poor | Good | Good |

*Can not be measured due to poor foam quality

The foam quality was further illustrated as in FIG. 1

Although the invention is illustrated and described herein with reference to specific embodiments, it is not intended that the appended claims be limited to the details shown. Rather, it is expected that various modifications may be made in these details by those skilled in the art, which modifications may still be within the spirit and scope of the claimed subject matter and it is intended that these claims be construed accordingly.

The invention claimed is:

1. A method of stabilizing a thermosetting foam blend premix containing a foam forming agent and a blowing agent comprising 1-chloro-3,3,3-trifluoropropene, comprising adding thereto methyl formate.

2. The method of claim 1 wherein said thermosetting foam blend further contains a surfactant, a catalyst, a flame retardant, a stabilizer/inhibitor and a carbon dioxide generating agent.

3. The method of claim 1 wherein said thermosetting foam blend premix is selected from the group consisting of polyurethane foam premixes, polyisocyanurate foam premixes, and phenolic foam premixes.

* * * * *